United States Patent
Yoshida et al.

(10) Patent No.: US 7,834,986 B2
(45) Date of Patent: Nov. 16, 2010

(54) VELOCIMETER

(75) Inventors: Noriyuki Yoshida, Yokohama (JP);
Noboru Hirabayashi, Kawasaki (JP);
Koji Nishida, Yamagata-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 57 days.

(21) Appl. No.: 12/405,096

(22) Filed: Mar. 16, 2009

(65) Prior Publication Data

US 2009/0237642 A1   Sep. 24, 2009

(30) Foreign Application Priority Data

Mar. 19, 2008   (JP)   ............................ 2008-070513

(51) Int. Cl.
*G01P 3/36* (2006.01)
(52) U.S. Cl. ........................................... 356/28
(58) Field of Classification Search ............... 356/4.01, 356/4.07, 28, 28.5
See application file for complete search history.

(56) References Cited

U.S. PATENT DOCUMENTS

| | | | |
|---|---|---|---|
| 4,887,213 A * | 12/1989 | Smart et al. ................... 701/3 |
| 5,351,116 A * | 9/1994 | Barton et al. ............... 356/28.5 |
| 7,049,578 B2 * | 5/2006 | Wada et al. ............. 250/231.13 |
| 7,199,867 B2 * | 4/2007 | Huang ......................... 356/28 |
| 7,317,538 B2 * | 1/2008 | Wada et al. .................. 356/486 |
| 7,333,185 B2 * | 2/2008 | Wada et al. .................... 356/28 |
| 2007/0165205 A1 * | 7/2007 | Williams et al. ........... 356/5.15 |

FOREIGN PATENT DOCUMENTS

JP   3423396 B2   7/2003

\* cited by examiner

*Primary Examiner*—Isam Alsomiri
(74) *Attorney, Agent, or Firm*—Canon U.S.A., Inc. I.P. Division

(57) ABSTRACT

A velocimeter is disclosed that includes a plurality of photodetectors detecting scattered light in different directions, the light being emitted from a laser source and reflected on a moving object. The velocimeter includes an analog-to-digital conversion unit converting detection signals of the photodetectors, a velocity calculator calculating velocities of the moving object, an amplitude calculator calculating the amplitudes of the detection signals, a dropout detector detecting dropouts of the detection signals, a time keeper keeping detection times of the dropouts, a switching-time calculator calculating signal switching times, a storage memory storing the velocities, the amplitudes, and the signal switching times, and an output selector selecting one of the velocities stored in the storage memory based on the amplitudes and the signal switching times and outputting the selected velocity.

8 Claims, 5 Drawing Sheets

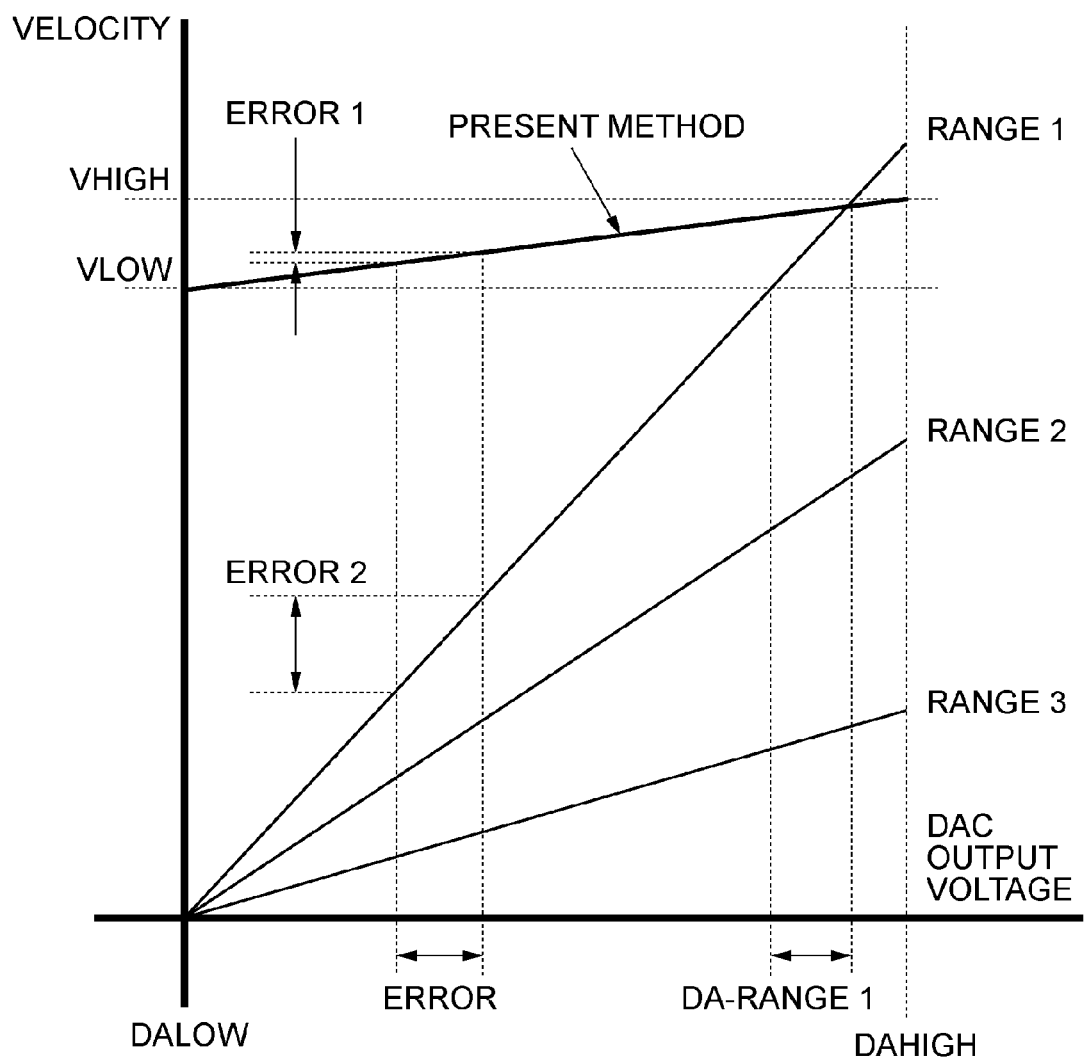

VELOCIMETER

BACKGROUND OF THE INVENTION

1. Field of the Invention

The present invention relates to a velocimeter, and in particular, to a laser Doppler velocimeter using the Doppler effect.

2. Description of the Related Art

Laser Doppler velocimeters have been used as devices measuring the velocity of a moving object with high accuracy in a contactless manner. The laser Doppler velocimeter irradiates the moving object with laser light to measure the velocity of the moving object using the effect (Doppler effect) in which the frequency of light scattered from the moving object changes (shifts) in proportion to the velocity of the moving object.

In the laser Doppler velocimeter, a detection signal proportional to a velocity obtained through a photodetector is generally based on scattered light. Accordingly, the detection signal has a low level. In addition, the signal-to-noise (S/N) ratio tends to be degraded due to noise superposition.

Additionally, the reflectivity or scattering state of the light depends on the state of the surface of the moving object, so that the signal level fluctuates. Disadvantageously, a Doppler signal may be interrupted during measurement, and thus dropout may occur.

To prevent such a dropout, for example, a method of improving the S/N ratio using a band-pass filter (BPF) and processing a Doppler signal as a continuous signal through a phase-locked loop (PLL) has been used. However, when dropouts frequently occur, the accuracy of measurement decreases due to the frequent occurrence of dropouts.

To overcome the disadvantages, for example, Japanese Patent No. 3423396 discloses a method of detecting light beams scattered from a specific area of a moving object in different directions through a plurality of photodetecting units.

According to Japanese Patent No. 3423396, a selecting unit is used to reduce the dropouts of detection signals of these photodetecting units. As disclosed in Japanese Patent No. 3423396, the selecting unit processes the detection signal of each photodetecting unit as it is in analog form.

Processes necessary for higher accuracy, (e.g., inter-signal phase shift processing, noise processing, and high time resolution processing on the detection signals of the photodetecting units), are difficult to perform using an analog circuit.

SUMMARY OF THE INVENTION

The present invention provides a velocimeter that easily realizes high-accuracy processing.

According to an aspect of the present invention, a velocimeter includes a plurality of photodetectors detecting scattered light in different directions, the light being emitted from a light source and reflected on a moving object. The velocimeter also includes an analog-to-digital conversion unit that converts detection signals of the photodetectors into digital form and outputs a plurality of digital signals, a velocity calculator that calculates velocities of the moving object based on the digital signals, an amplitude calculator that calculates amplitudes of the detection signals based on the digital signals, a dropout detector that detects dropouts of the detection signals based on the amplitudes calculated by the amplitude calculator, a time keeper that keeps detection times at each of which a dropout has been detected by the dropout detector, a switching-time calculator that calculates signal switching times of the digital signals based on the detection times, a storage unit that stores the velocities, the amplitudes, and the signal switching times calculated from the digital signals, and an output selector that selects one of the velocities stored in the storage unit based on a result of comparison between the amplitudes and a result of determination as to whether the digital signals are not relevant to the signal switching times, and outputs the selected velocity.

Further features of the present invention will become apparent from the following description of exemplary embodiments with reference to the attached drawings.

BRIEF DESCRIPTION OF THE DRAWINGS

FIG. 5 is a diagram illustrating the voltage relationship between a velocity and an analog output.

DESCRIPTION OF THE EMBODIMENTS

Figure 1:
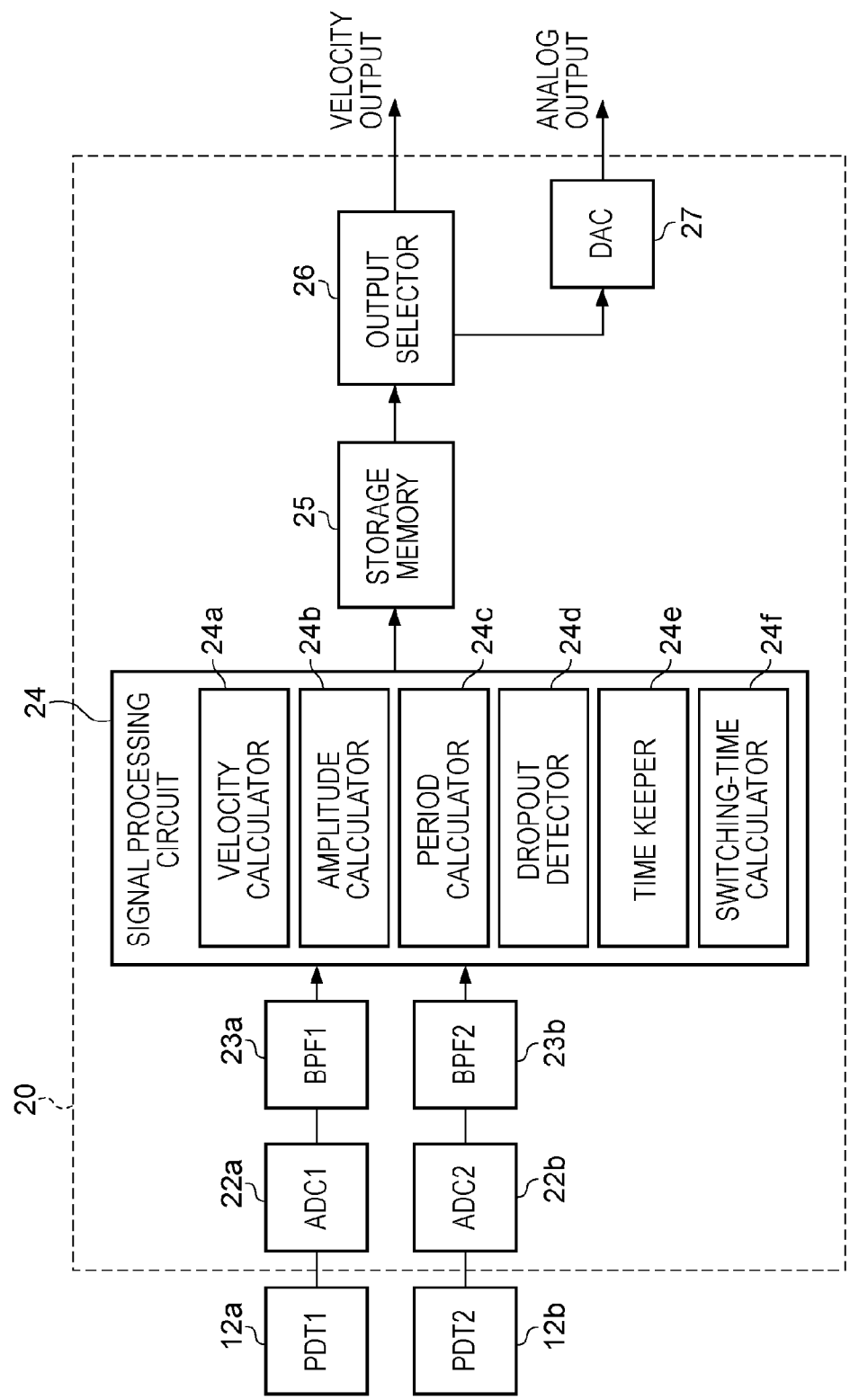
FIG. 1 is a block diagram of a signal processing unit in a laser Doppler velocimeter.

Various embodiments of the present invention will be described in detail below with reference to the drawings. In the figures, the same components are designated by the same reference numerals and redundant description is avoided.

Figure 2:
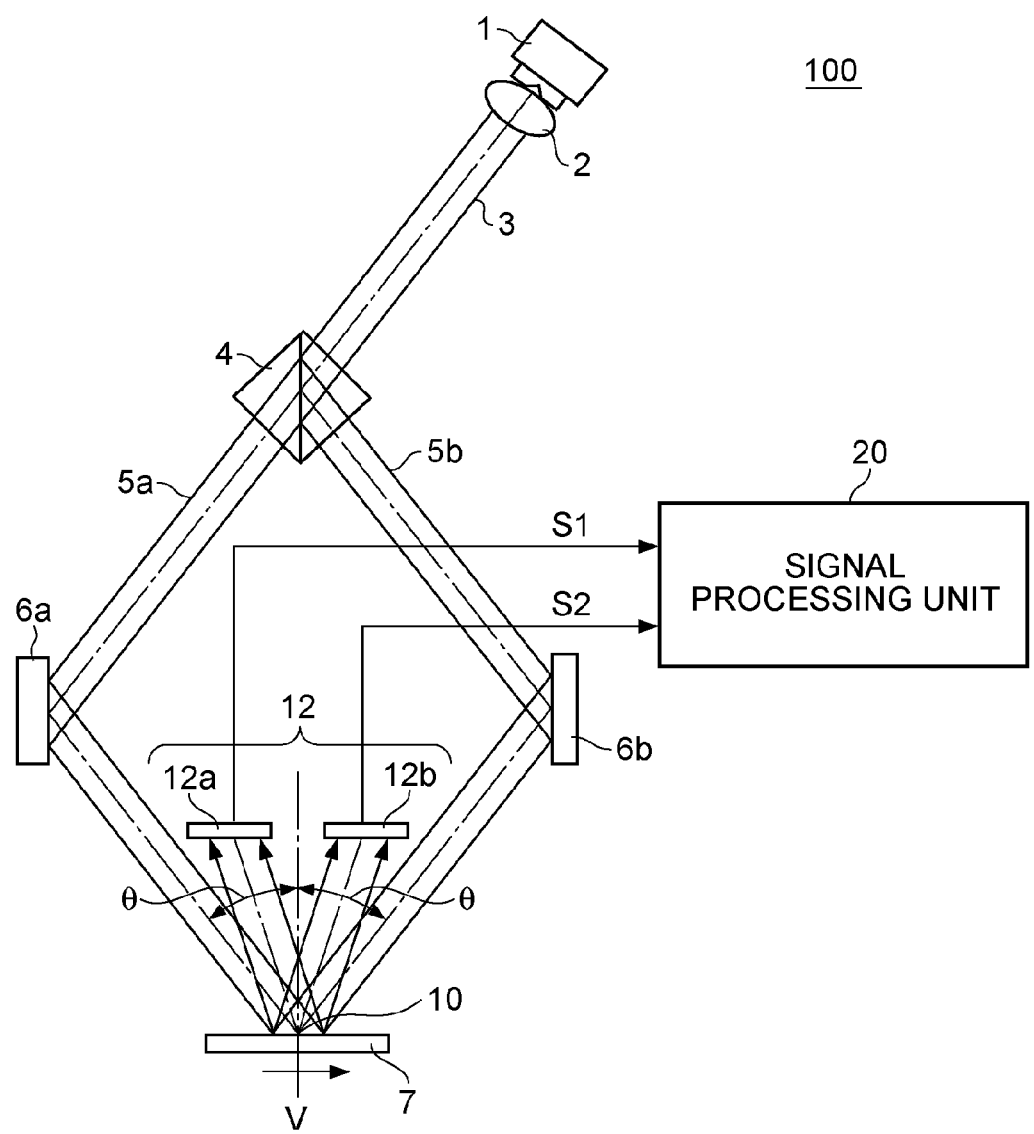
FIG. 2 is a schematic diagram illustrating the laser Doppler velocimeter.

FIG. 2 is a schematic diagram illustrating a laser Doppler velocimeter according to a first embodiment of the present invention.

The laser Doppler velocimeter, indicated at 100, includes a laser source (light source) 1. Laser light emitted from the laser source 1 is collimated into a collimated light beam 3 by a collimator lens 2. The collimated light beam 3 is split into two light beams, i.e., transmitting light 5a and reflected light 5b through a beam splitter 4. The transmitting light 5a and the reflected light 5b are reflected by reflecting mirrors 6a and 6b, respectively.

The two light beams reflected by the reflecting mirrors 6a, 6b are incident on a moving object 7, which is moving at a velocity V, at an incident angle θ in different directions, respectively. The two light beams are projected onto an area 10 in the moving object 7 and are scattered by the moving object 7.

The light scattered from the area 10 in the moving object 7 is detected by a plurality of photodetectors 12a and 12b arranged in different directions. The photodetectors 12a and 12b are included in a photodetecting unit 12. In other words, the photodetectors 12a and 12b each serve as an element of the photodetecting unit 12. In the present embodiment, two photodetectors 12a and 12b are used. However, in an alternative embodiment of the present invention, the photodetecting unit 12 includes three photodetectors. In other alternative embodiments of the present invention, the photodetecting unit 12 includes four or more photodetectors.

The frequency of the scattered light detected by each of the photodetectors 12a and 12b is proportional to the velocity V of the moving object 7 and is affected by a frequency shift (Doppler shift) $+\Delta f$ or $-\Delta f$. In this instance, when let λ be the wavelength of the laser beam, the frequency shift $\Delta f$ can be expressed by the following Expression (1).

$$\Delta f = V \cdot \sin(\theta) / \lambda \qquad (1)$$

The rays of the scattered light, affected by the frequency shifts (Doppler shifts) +Δf and −Δf, interfere with each other to produce a light pattern of bright and dark portions on the light receiving surface of each of the photodetectors 12a and 12b. The frequency at that time is called "Doppler frequency". The Doppler frequency F is given by the following Expression (2).

$$F = 2 \cdot \Delta f = 2 \cdot V \cdot \sin(\theta)/\lambda \quad (2)$$

The photodetectors 12a and 12b output signals S1 and S2 to a signal processing unit 20, respectively. The signal processing unit 20 measures the Doppler frequency F on the basis of the signals S1 and S2 and calculates the velocity V of the moving object 7 using Expression (2).

As described above, the laser Doppler velocimeter 100 according to the present embodiment includes the photodetectors 12a and 12b which detect scattered light, emitted from the laser source 1 and reflected on the moving object 7, in the different directions.

The signal processing unit 20 in accordance with the present embodiment will now be described in detail. FIG. 1 is a block diagram of the signal processing unit in the laser Doppler velocimeter according to the present embodiment.

Referring to FIG. 1, the signal processing unit 20 in accordance with the present embodiment includes analog-to-digital converters (hereinafter, referred to as "A/D converters" or "ADCs") 22a and 22b, band-pass filters (hereinafter, also referred to as "BPFs") 23a and 23b, a signal processing circuit 24, a storage memory 25, an output selector 26, and a digital-to-analog converter (hereinafter, also referred to as "D/A converter" or "DAC") 27.

The detection signal S1 output from the photodetector (PDT1) 12a is supplied to the A/D converter (ADC1) 22a. The A/D converter 22a converts the detection signal S1 in analog form into digital form to output a digital signal. Similarly, the detection signal S2 output from the photodetector (PDT2) 12b is supplied to the A/D converter (ADC2) 22b. The A/D converter 22b converts the detection signal S2 in analog form into digital form to output a digital signal. As described above, the A/D converters 22a and 22b convert the detection signals S1, S2 output from the photodetectors 12a, 12b into digital form and output the digital signals.

The digital signal output from the A/D converter 22a is supplied to the band-pass filter (BPF1) 23a which improves the S/N ratio of the signal. Similarly, the digital signal output from the A/D converter 22b is supplied to the band-pass filter (BPF2) 23b which improves the S/N ratio of the signal.

In the related art, an analog filter is disposed upstream of an A/D converter to reduce noise. According to the present embodiment, high-performance digital filters (BPF1, BPF2) are disposed downstream of the A/D converters 22a and 22b, respectively. This arrangement can realize a more practical, higher accuracy measuring device.

Output signals of the respective band-pass filters 23a and 23b are supplied to the signal processing circuit 24. The signal processing circuit 24 includes a velocity calculator 24a, an amplitude calculator 24b, a period calculator 24c, a dropout detector 24d, a time keeper 24e, and a switching-time calculator 24f.

The velocity calculator 24a calculates velocities of the moving object 7 on the basis of a plurality of digital signals. The velocity calculator 24a simultaneously calculates velocities equal in number to the photodetectors. Since the two photodetectors 12a and 12b are arranged in the present embodiment, two velocities are simultaneously calculated.

The amplitude calculator 24b calculates the amplitudes of the detection signals S1, S2 on the basis of the respective digital signals output from the band-pass filters 23a, 23b. The amplitudes obtained by the amplitude calculator 24b are used to detect dropouts which will be described later. The amplitude calculator 24b simultaneously calculates the amplitudes of the detection signals S1, S2 output from the respective photodetectors 12a, 12b.

The period calculator 24c calculates the periods of the detection signals S1, S2 on the basis of the respective digital signals output from the band-pass filters 23a, 23b. The period calculator 24c simultaneously calculates the periods of the detection signals S1, S2 output from the respective photodetectors 12a, 12b.

The dropout detector 24d detects dropouts of the detection signals S1, S2 on the basis of the amplitudes calculated by the amplitude calculator 24b. For example, when the amplitude of the detection signal (S1, S2) is lower than a predetermined threshold value, the dropout detector 24d in the present embodiment detects a dropout.

Additionally, the dropout detector 24d detects a dropout on the basis of the amount of variation in the period of the detection signal (S1, S2). For example, when the amount of variation in the period of the detection signal (S1, S2) is equal to or larger than a predetermined value, the dropout detector 24d detects a dropout. The dropout detector 24d determines on each of the detection signals S1, S2 whether a dropout has occurred.

The time keeper 24e keeps time (hereinafter, referred to as "dropout detection time") when a dropout has been detected by the dropout detector 24d. The time keeper 24e keeps the dropout detection times with respect to the detection signals S1 and S2.

The switching-time calculator 24f calculates signal switching times with respect to the digital signals on the basis of the dropout detection times. The signal switching time is the time before the dropout detection time by a predetermined period of time. The switching-time calculator 24f calculates the switching times with respect to the detection signals S1 and S2.

The velocities, the amplitudes, and the signal switching times calculated in the signal processing circuit 24 are stored into the storage memory (storage unit) 25. As mentioned above, the storage memory 25 stores the velocities, the amplitudes, and the signal switching times calculated on the basis of the digital signals.

The output selector 26 refers to information regarding the amplitudes stored in the storage memory 25 and selects the velocity calculated using the digital signal having an amplitude larger than the predetermined threshold value among the digital signals. For example, the selected velocity may be obtained from the digital signal having the largest amplitude.

In addition, the output selector 26 refers to the signal switching times stored in the storage memory 25 and switches the velocity which is currently used to the other velocity obtained from the other digital signal. Switching from the currently used velocity to the other velocity obtained from the other digital signal is performed at the signal switching time which is the time before the dropout detection time by the predetermined period of time.

As described above, the output selector 26 refers to the velocities and the signal switching times, selects the velocity obtained on the basis of the detection signal having an amplitude larger than at least the predetermined threshold value among the digital signals which are not relevant to the signal switching times, and outputs a signal indicative of the selected velocity. More specifically, the output selector 26 selects one of the velocities stored in the storage memory 25 on the basis of the result of comparison between the amplitudes and the result of determination as to whether the digital signals are not relevant to the signal switching times, and outputs the selected velocity.

According to the present embodiment, the output selector 26 can selectively extract the optimum velocity by eliminating low-accuracy velocities calculated at times around the dropout detection times in consideration of the signal switching times. Accordingly, the laser Doppler velocimeter according to the present embodiment can obtain the velocity V of the moving object 7 using the high-accuracy velocity selected by the output selector 26.

The respective calculations in the signal processing unit 20 are performed every period of the Doppler signal. The product of a velocity for each period and the length of period is obtained, so that the distance of movement of the moving object for each period can be calculated. The movement distances for the respective periods are added, so that the total movement distance of the moving object can be obtained.

As described above, according to the present embodiment, the various calculations in the signal processing unit 20 enables velocity and movement-distance measurements with high accuracy and high time resolution. When the signal indicative of the velocity output from the output selector 26 is supplied to a personal computer through USB, the signal can be utilized for various data processes as it has high accuracy.

To select a proper velocity, the output selector 26 may also be configured to take the dropout detection time of a signal as a switching target into consideration upon signal switching. At that time, the output selector 26 is controlled so as not to perform signal switching at times around the time when a dropout occurs in the switching target digital signal.

To perform such control, the switching-time calculator 24f recalculates the signal switching times in consideration of the times around the time when a dropout occurs in the switching target signal. When a velocity is selected on the basis of the recalculated signal switching times, noises generated around the dropout of the switching target signal can be reliably eliminated, so that the velocity can be selected with high reliability.

Figure 3:
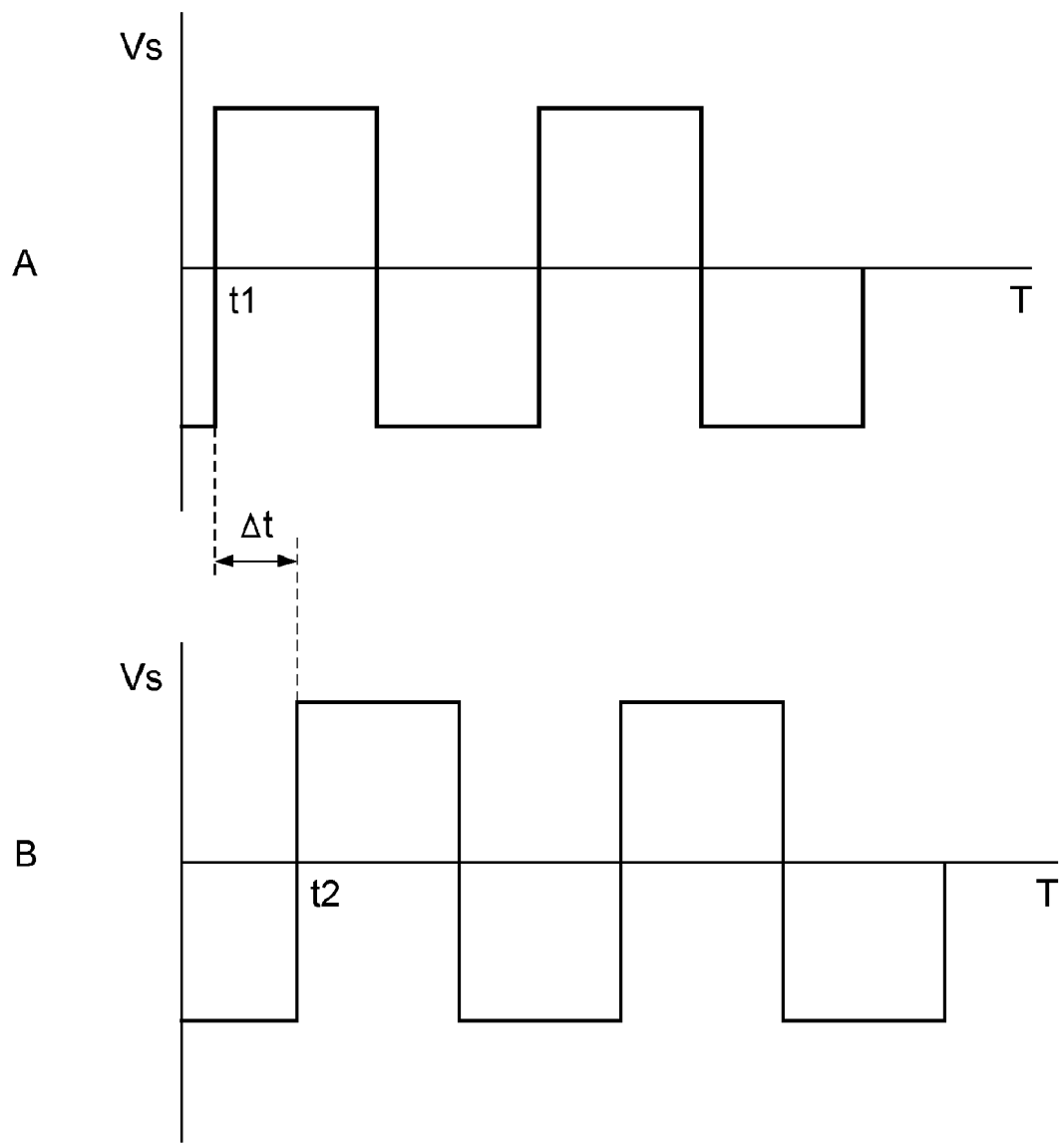
FIG. 3 is a waveform chart of digital signals input to a signal processing circuit.

Calculation by the switching-time calculator 24f upon signal switching will now be described. FIG. 3 is a waveform chart of digital signals supplied to the signal processing circuit 24 in accordance with the present embodiment. FIG. 3 show the voltage (Vs) of each digital signal plotted against the time (T). In FIG. 3, the waveform A corresponds to the digital signal selected before switching by the output selector 26 and the waveform B corresponds to the other digital signal selected after switching.

Upon determining the velocity V of the moving object 7, the digital signal selected before switching has the waveform A in FIG. 3. The output selector 26 switches the signal to the other digital signal having the waveform B in FIG. 3 during detecting a frequency signal. In this instance, when the signal waveforms A and B in FIG. 3 are in phase, the signal having the waveform A can be easily switched to the signal having the waveform B without causing any time lag (error).

However, a phase shift Δt is caused between the signals having the waveforms A and B as shown in FIG. 3. When switching is merely performed between these signals, the determined velocity of the moving object 7 contains an error caused by the phase shift Δt. The error caused by the phase shift Δt is eliminated as described below.

The phase shift Δt is obtained from the difference between the rising time t1 of the square wave having the waveform A in FIG. 3 and the rising time t2 of the square wave having the waveform B. According to the present embodiment, the signal processing unit 20 observes the phase shift Δt between the signals having the waveforms A and B in FIG. 3 in order to eliminate the error caused by the phase shift Δt. Observing the phase shift Δt can eliminate an error caused upon signal switching.

Although the rising times of the respective signals are used as reference times for obtaining the phase shift Δt in the present embodiment, the reference times are not limited to these times. For example, in an alternative embodiment of the present invention, the falling times of the respective signals may be used as references instead of the rising times of the signals.

As for the error caused by the phase shift, only the relationship between the two signals having the square waveforms A and B of FIG. 3 has been described for the sake of convenience. The same applies to the relationship between two or more signals having other waveform shapes.

As described above, the output selector 26 corrects the phase shift Δt between the digital signal selected before switching and that selected after switching to obtain the velocity. Accordingly, an error caused upon signal switching can be eliminated.

An analog output of the signal processing unit 20 will now be described. As described above, the output selector 26 outputs the velocity as a digital signal. In addition, when outputting the velocity as an analog signal, the output selector 26 can output the high-accuracy signal indicative of the velocity.

Figure 4:
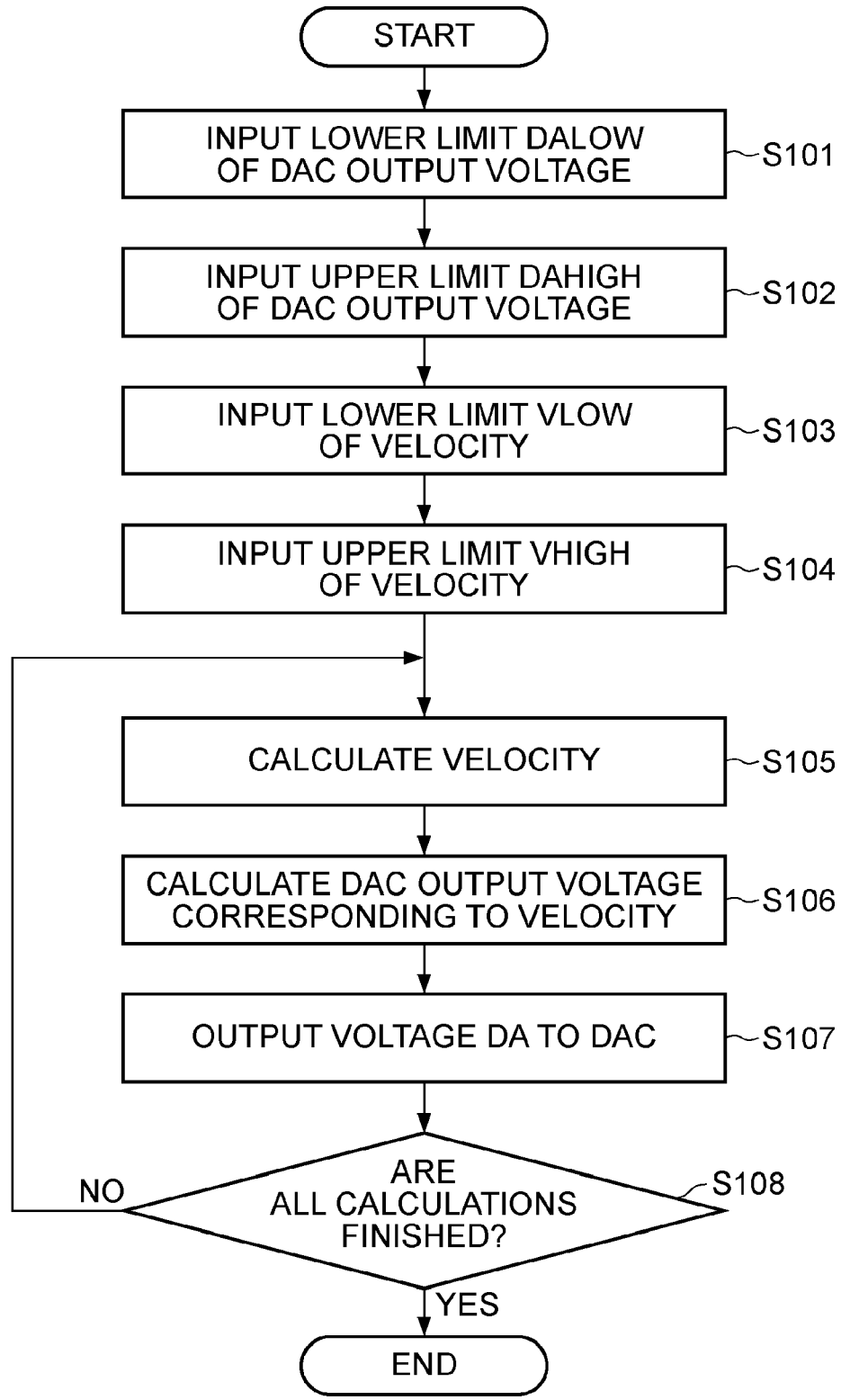
FIG. 4 is a flowchart illustrating an example of calculation by an output selector.

FIG. 4 is a flowchart illustrating an example of calculation by the output selector in accordance with the present embodiment. This flowchart describes a method of calculation for the proper voltage relationship upon converting a digital signal into an analog signal.

According to the present embodiment, the signal processing unit 20 includes the D/A converter (DAC) 27 which converts the digital signal (velocity) output from the output selector 26 into an analog signal. The D/A converter 27 converts the velocity output from the output selector 26 into analog form to output an analog signal.

Referring to FIG. 4, the output selector 26 is allowed to store a range of voltages which the D/A converter 27 can output. Specifically, a lower limit (DALOW) of an output voltage (DAC output voltage) of the D/A converter 27 is input (step S101). In addition, an upper limit (DAHIGH) of the DAC output voltage is input (step S102). These input values are stored by the output selector 26.

A range of velocities to be output, namely, the range of velocities output from the output selector 26 is specified. More specifically, a lower limit (VLOW) of the velocity corresponding to the lower limit (DALOW) of the DAC output voltage is input (step S103). An upper limit (VHIGH) of the velocity corresponding to the upper limit (DAHIGH) of the DAC output voltage is input (step S104). These input values are stored by the output selector 26.

The output selector 26 calculates the velocity V on the basis of the stored values using the foregoing Expression (2) (step S105). The output selector 26 then calculates a DAC output voltage (DA) corresponding to the velocity V using the following Expression (3) (step S106).

$$DA = (V - VLOW)/(VHIGH - VLOW) * (DAHIGH - DALOW) \quad (3)$$

The calculation using Expressions (2) and (3) is performed every unit time. The DAC output voltage (DA), serving as the result of calculation, is output to the D/A converter 27 (step S107). Steps S105 to S107 are repeated until all of calculations for the DAC output voltages are finished (step S108).

The DAC output voltages are output in analog form by the D/A converter 27, so that the velocities V can be observed by, for example, an oscilloscope.

The reasons why a slight variation in velocity can be measured even when the velocity of the moving object 7 is high and the result of measurement can be obtained with high accuracy without being affected by circuitry noise or the precision of a circuit element will now be described.

FIG. 5 is a diagram illustrating the voltage relationship between the velocity and the analog output.

In a typical laser Doppler velocimeter using analog signal processing, when a velocity calculated using a digital signal is output as an analog signal, a frequency-to-voltage (FV) converter is used. To output a velocity in analog form, a range suitable for the velocity can be selected.

For example, when the velocity of the moving object is low, RANGE 3 in FIG. 5 may be selected. When the velocity is high, RANGE 1 may be selected. To observe a range between the lower limit VLOW and the upper limit VHIGH of the velocity shown in FIG. 5, RANGE 1 has to be selected. However, the range of DAC output voltages output to the D/A converter 27 lies only within DA-RANGE 1 as shown in FIG. 5.

On the other hand, according to the method of the present embodiment, the range between the lower limit VLOW and the upper limit VHIGH of the velocity can be converted into a full range (between the lower limit DALOW and the upper limit DAHIGH of the output voltage) of the D/A converter 27. As described above, the velocimeter according to the present embodiment can set a range of velocities which can be output in analog form to any range. Advantageously, the velocimeter according to the present embodiment can easily observe a slight variation in velocity.

Assuming that circuitry noise or an error of a circuit element lies within a range indicated by "ERROR" in FIG. 5, when RANGE 1 is selected, a large velocity error, indicated by "ERROR 2", occurs. On the other hand, according to the method of the present embodiment, a velocity error, indicated by "ERROR 1", can be set within a very small range.

According to the present embodiment, processes necessary for higher accuracy, e.g., inter-signal phase shift processing, noise processing, and high time resolution processing can be easily realized. Therefore, the present embodiment can provide the velocimeter that easily realizes high-accuracy processing.

While the present invention has been described with reference to various exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-070513 filed Mar. 19, 2008, which is hereby incorporated by reference herein in its entirety.

What is claimed is:

1. A velocimeter comprising:
    a plurality of photodetectors detecting scattered light in different directions, the light being emitted from a light source and reflected on a moving object;
    an analog-to-digital conversion unit configured to convert detection signals of the photodetectors into digital form and output a plurality of digital signals;
    a velocity calculator configured to calculate velocities of the moving object based on the digital signals;
    an amplitude calculator configured to calculate amplitudes of the detection signals based on the digital signals;
    a dropout detector configured to detect dropouts of the detection signals based on the amplitudes calculated by the amplitude calculator;
    a time keeper configured to keep detection times at each of which a dropout has been detected by the dropout detector;
    a switching-time calculator configured to calculate signal switching times of the digital signals based on the detection times;
    a storage unit configured to store the velocities, the amplitudes, and the signal switching times calculated from the digital signals; and
    an output selector configured to select one of the velocities stored in the storage unit based on a result of comparison between the amplitudes and a result of determination as to whether the digital signals are not relevant to the signal switching times, and output the selected velocity.

2. The velocimeter according to claim 1, further comprising:
    a period calculator configured to calculate periods of the respective digital signals, wherein
    the dropout detector is configured to detect the dropouts of the respective detection signals based on amounts of variation in the periods.

3. The velocimeter according to claim 2, wherein the dropout detector is configured to detect the dropout when the amount of variation in the period of one of the digital signals is larger than a predetermined value.

4. The velocimeter according to claim 1, wherein the dropout detector is configured to detect the dropout when the amplitude of one of the detection signals is smaller than a predetermined value.

5. The velocimeter according to claim 1, wherein the output selector is configured to select the velocity calculated from the detection signal having the largest amplitude among the amplitudes and output the selected velocity.

6. The velocimeter according to claim 1, wherein the output selector is configured to correct a phase shift between the digital signal whose velocity is selected before switching and the digital signal whose velocity is selected after switching and obtain the velocity of the moving object.

7. The velocimeter according to claim 1, further comprising:
    a digital-to-analog conversion unit configured to convert the velocity output from the output selector into analog form and output the velocity in analog form as an analog signal, wherein
    a range of velocities to be output in analog form is set to any range.

8. The velocimeter according to claim 1, wherein the velocity calculator is configured to calculate the velocity of the moving object every period of each detection signal.

* * * * *